United States Patent
Murray et al.

(10) Patent No.: US 9,357,703 B2
(45) Date of Patent: Jun. 7, 2016

(54) PIVOT SUPPORT MEMBER FOR AGRICULTURAL MACHINE

(71) Applicant: CNH America LLC, New Holland, PA (US)

(72) Inventors: Craig E. Murray, Davenport, IA (US); Justin L. Montenguise, Bettendorf, IA (US); Nicholas S. Shane, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 393 days.

(21) Appl. No.: 13/934,330

(22) Filed: Jul. 3, 2013

(65) Prior Publication Data

US 2015/0011274 A1 Jan. 8, 2015

(51) Int. Cl.
*A01D 41/00* (2006.01)
*A01D 41/12* (2006.01)

(52) U.S. Cl.
CPC .................................. *A01D 41/1243* (2013.01)

(58) Field of Classification Search
CPC ... A01D 41/12; A01D 41/1243; A01D 41/14; A01F 12/40
USPC .................................. 460/111, 112; 198/641
See application file for complete search history.

(56) References Cited

U.S. PATENT DOCUMENTS

| 1,625,353 A * | 4/1927 | Dugan ................ A01D 41/1243 198/641 |
| 3,712,309 A | 1/1973 | Schmitz |
| 4,637,406 A | 1/1987 | Guinn et al. |
| 4,669,489 A | 6/1987 | Schraeder et al. |
| 5,021,030 A | 6/1991 | Halford et al. |
| 5,433,664 A | 7/1995 | Bonde |
| 6,238,286 B1 | 5/2001 | Aubry et al. |
| 6,251,009 B1 | 6/2001 | Grywacheski et al. |
| 6,406,368 B1 | 6/2002 | Cruson et al. |
| 6,547,169 B1 | 4/2003 | Matousek et al. |
| 6,719,627 B2 | 4/2004 | Wolters et al. |
| 6,979,262 B2 | 12/2005 | Maro et al. |
| 7,261,633 B2 | 8/2007 | Benes |
| 7,635,299 B2 * | 12/2009 | Murray ............. A01D 41/1243 460/111 |
| 7,896,732 B2 | 3/2011 | Benes et al. |
| 7,927,200 B2 | 4/2011 | Van Overschelde et al. |
| 8,585,475 B2 * | 11/2013 | Isaac ..................... A01F 12/40 460/111 |
| 2012/0270613 A1 | 10/2012 | Isaac et al. |

FOREIGN PATENT DOCUMENTS

| CA | 2107948 A1 | 4/1995 |
| EP | 0 223 170 A1 | 11/1986 |
| EP | 0 516 891 A1 | 6/1991 |
| EP | 0635198 A1 | 1/1995 |
| EP | 1 479 279 A1 | 5/2004 |

* cited by examiner

Primary Examiner — Robert Pezzuto
(74) Attorney, Agent, or Firm — Patrick M. Sheldrake

(57) ABSTRACT

An agricultural machine includes: a base member; a residue assembly; a support member assembly being pivotally coupled with the base member and being connected to the residue assembly, the support member assembly supporting the residue assembly and being configured for moving the residue assembly relative to the base member between a residue assembly operating position and a residue assembly service position about a pivot axis substantially without raising an elevation of the residue assembly when the residue assembly is in the residue assembly service position.

9 Claims, 12 Drawing Sheets

PIVOT SUPPORT MEMBER FOR AGRICULTURAL MACHINE

BACKGROUND OF THE INVENTION

1. Field of the Invention

The present invention relates to agricultural machines such as agricultural harvesters, and, more particularly, to reside assemblies for spreading and/or chopping crop residue used with such machines.

2. Description of the Related Art

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

During normal use of an agricultural machine, such as a combine, the operator will occasionally need to adjust/change the sieves, inspect chopper knives, and the like. This requires the operator to have access to the rear of the machine. To gain access to these components, a person may have to remove the spreader disks and place them aside, which leaves them open to be lost or damaged. The coupler that connects these disks fills with debris and can be difficult to remove and reinstall. Another issue with this operation is that it leaves a portion of the drive shaft for the spreader disks attached to the chassis and protruding downwardly. These shafts can make installing and removing sieves difficult.

Further, gaining access to the cleaning system on machines having rear-mounted spreaders and/or rear mounted choppers can occur in two other ways. One way provides that the residue system slides rearward some amount. This allows easy access for the operator but can still hinder changing the sieves. The other way provides for pivoting the residue package upward. While this can be automated and easily done, there is now a large amount of weight overhead.

What is needed in the art is a way to access, easily and safely, one or more assemblies, such as sieves and/or choppers, of an agricultural machine which has a rear-mounted residue assembly, such as rear-mounted spreaders and/or rear mounted choppers.

SUMMARY OF THE INVENTION

The present invention provides an agricultural support system for moving a rear-mounted residue assembly from an operating position to a service position, thereby allowing an operator to access, easily and safely, sieves, choppers, and/or other components of an agricultural machine.

The invention in one form is directed to an agricultural machine includes: a base member; a residue assembly; a support member assembly being pivotally coupled with the base member and being connected to the residue assembly, the support member assembly supporting the residue assembly and being configured for moving the residue assembly relative to the base member between a residue assembly operating position and a residue assembly service position about a pivot axis substantially without raising an elevation of the residue assembly when the residue assembly is in the residue assembly service position.

The invention in another form is directed to an agricultural support system for being coupled with a base member of an agricultural machine, the agricultural support system comprising: a residue assembly; a support member assembly configured for being pivotally coupled with the base member, the support member assembly being connected to and supporting the residue assembly and being configured for moving the residue assembly relative to the base member between a residue assembly operating position and a residue assembly service position about a pivot axis substantially without raising an elevation of the residue assembly when the residue assembly is in the residue assembly service position.

The invention in yet another form is directed to a method of using an agricultural machine, the method comprising the steps of: providing a base member, a residue assembly, and a support member assembly, the support member assembly being pivotally coupled with the base member and being connected to the residue assembly, the support member assembly supporting the residue assembly; and moving, using the support member assembly, the residue assembly relative to the base member between a residue assembly operating position and a residue assembly service position about a pivot axis substantially without raising an elevation of the residue assembly when the residue assembly is in the residue assembly service position.

An advantage of the present invention is that it provides a pivotable structure that mounts the residue spreaders on a combine. This allows for the spreaders to be moved rearward and positioned beside the tire for access to sieves and the chopper, the spreaders thereby being able to swing out for service.

Another advantage of the present invention is that it does not require the removal and storage of components from the machine to access the separator and chopper. Lightweight materials used to make removal easier can be replaced with more cost effective alternatives.

Yet another advantage of the present invention is that it offers more open area directly behind the machine for service of the chopper and sieves.

Yet another advantage of the present invention is that it provides a double pivot joint which allows for the spreader assembly to be positioned in alternate places other than just the operational position and only one service position. In other words, the spreader assembly can be positioned in a plurality of either predetermined or non-predetermined service positions.

Yet another advantage of the present invention is that it provides that the spreader is not overhead when the spreader is in the service position.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain," "straw," and "tailings" are used in this specification principally for convenience, but it is to be understood that these terms are not intended to be limiting. Thus "grain" refers to that part of the crop material which is threshed and separated from the discardable part of the crop material, which is referred to as non-grain crop material, MOG, or straw. Incompletely threshed crop material is referred to as "tailings". Also, the terms "forward," "rearward," "left," and "right," when used in connection with movable agricultural equipment such as an agricultural harvester and/or components thereof are usually determined with reference to the direction of forward operative travel of the harvester; but, again, they should not be construed as limiting. The terms "longitudinal" and "transverse" are determined with reference to the fore-and-aft direction of the agricultural harvester and are equally not to be construed as limiting.

Figure 1:
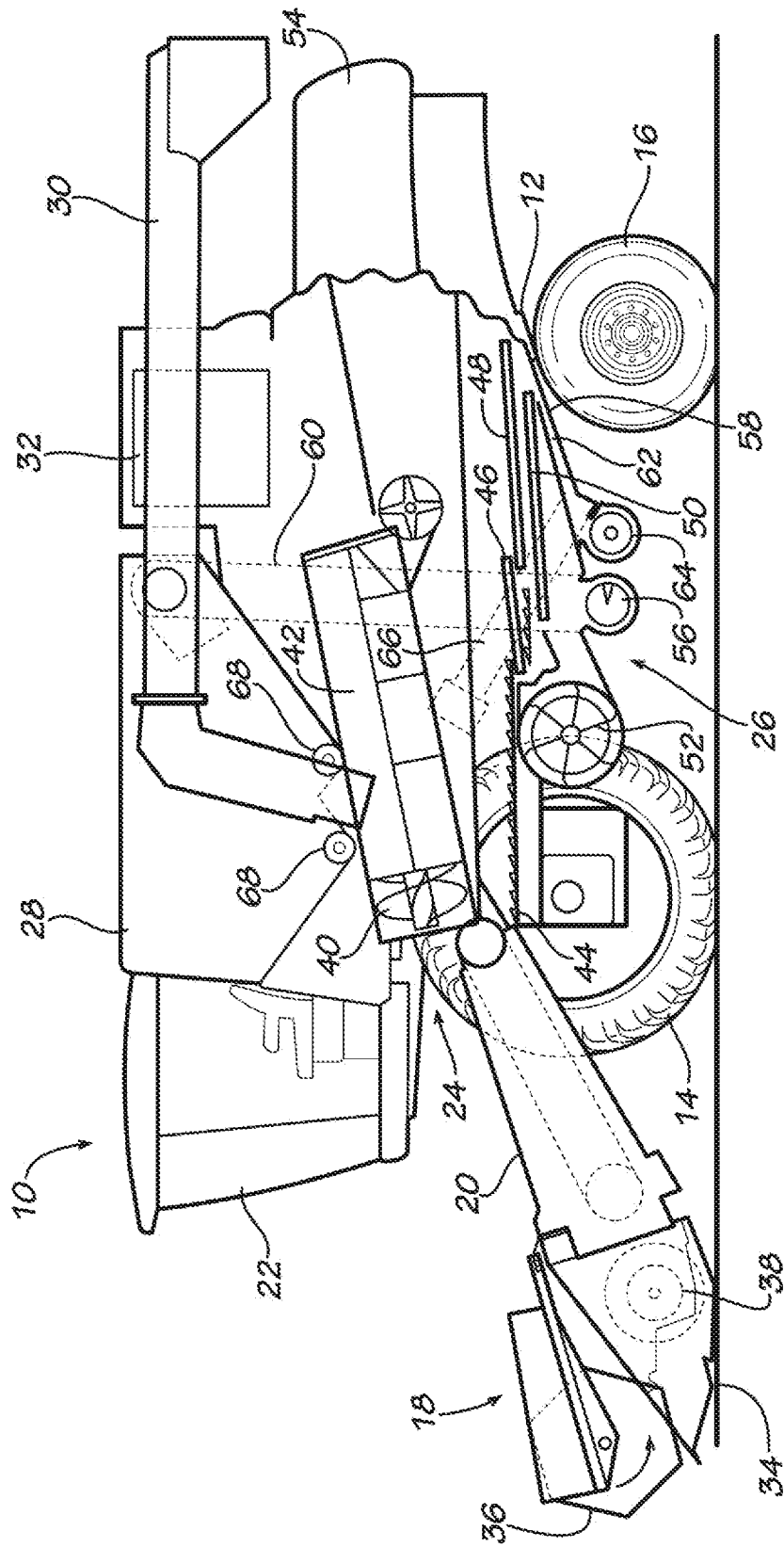
FIG. 1 is a side view schematically showing an agricultural machine.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, it is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24 and is selectively vertically movable using appropriate actuators, such as hydraulic cylinders (not shown).

Threshing and separating system 24 is of the axial-flow type and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 of cleaning system 26. Clean grain auger 56 conveys the clean grain laterally to a generally vertically arranged grain elevator 60 for transport to grain tank 28. Tailings from cleaning system 26 fall to a tailings auger trough 62 via bottom pan 58. The tailings are transported via tailings auger 64 and return auger 66 to the upstream end of cleaning system 26 for repeated cleaning action. A pair of grain tank augers 68 at the bottom of grain tank 28 conveys the clean grain laterally within grain tank 28 to unloading auger 30 for discharge from combine 10.

Figure 2:
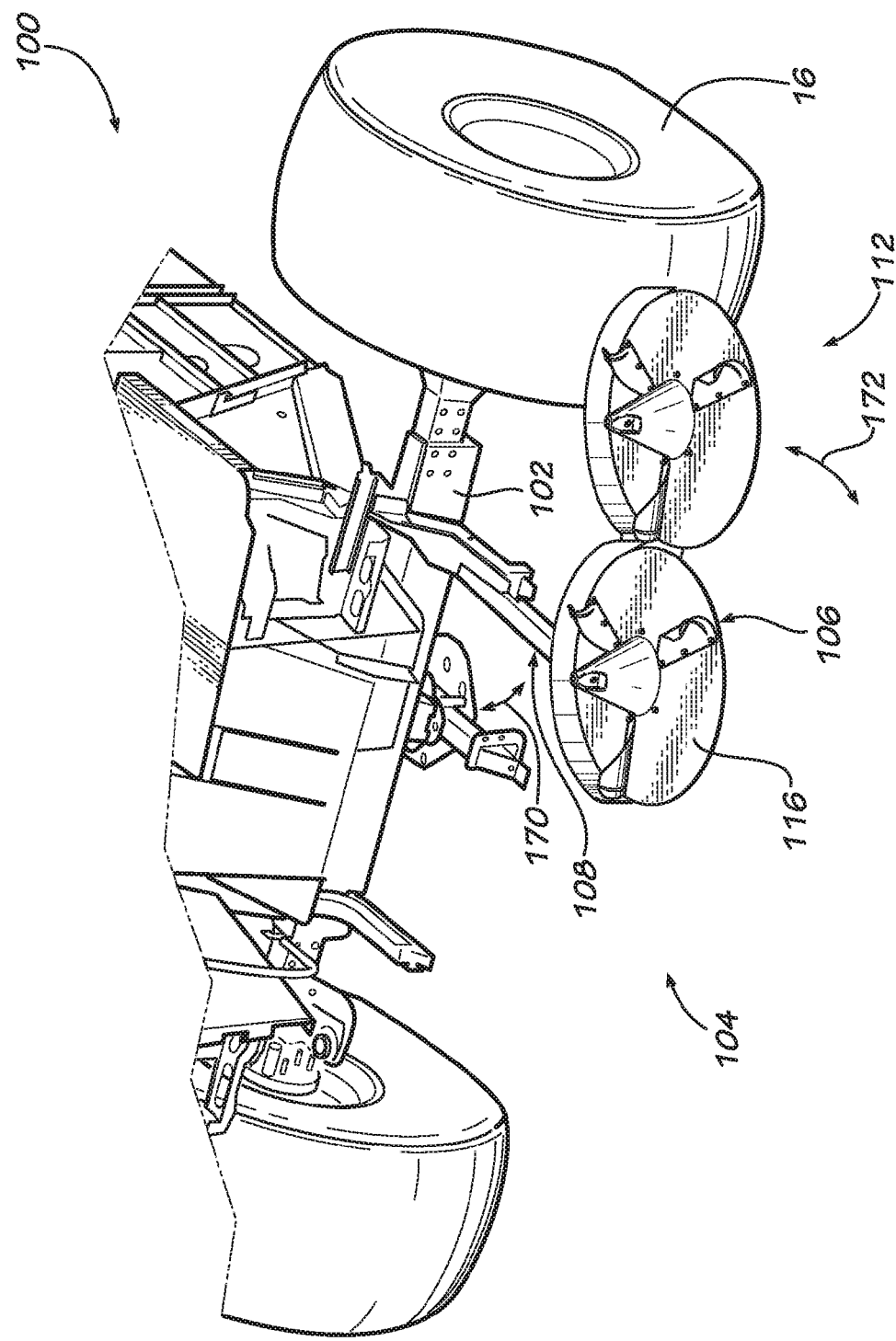
FIG. 2 is a perspective view of an agricultural machine according to the present invention, with portions broken away.
Figure 3:
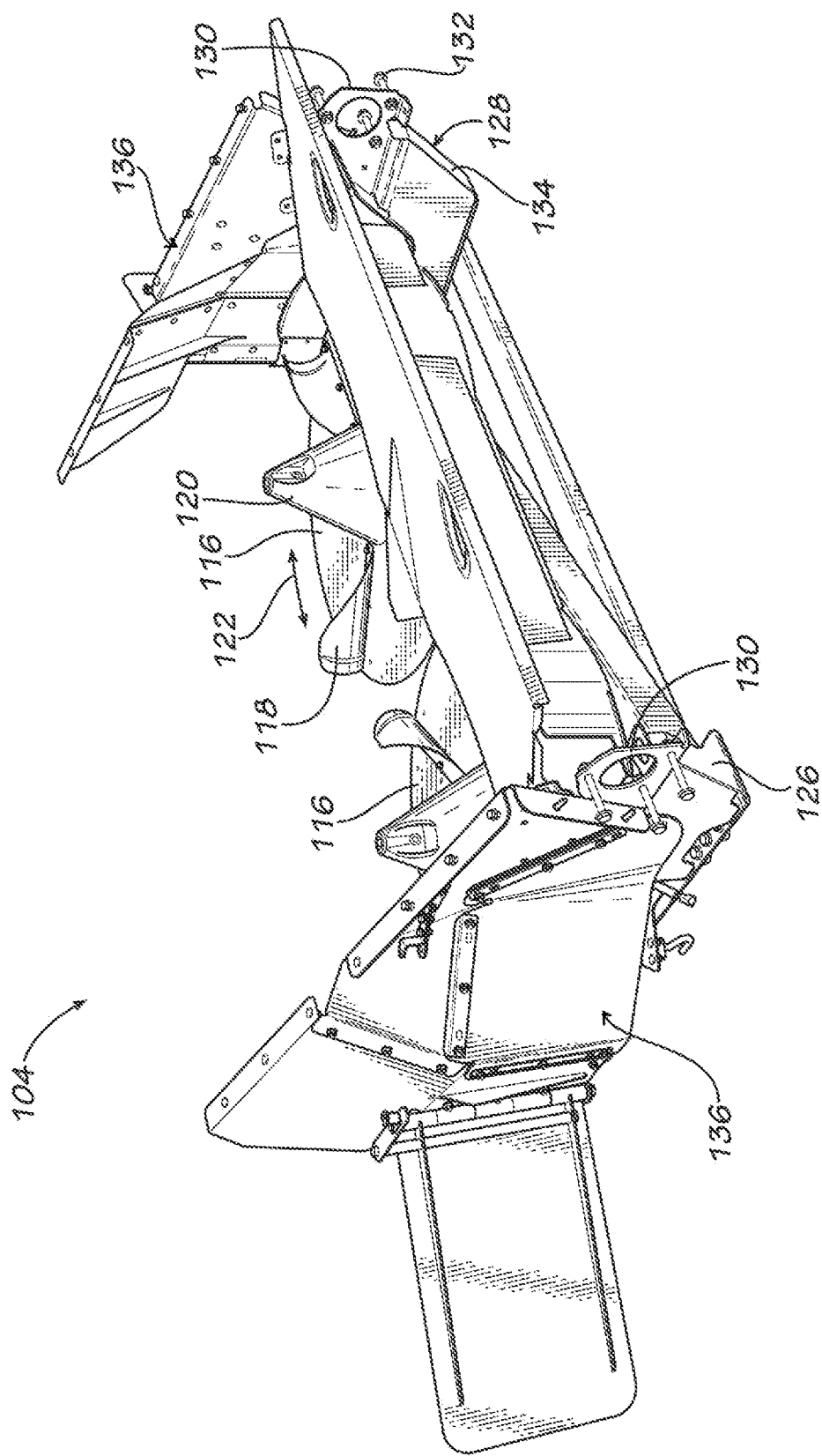
FIG. 3 is a perspective view of an agricultural support system of FIG. 2.
Figure 4:
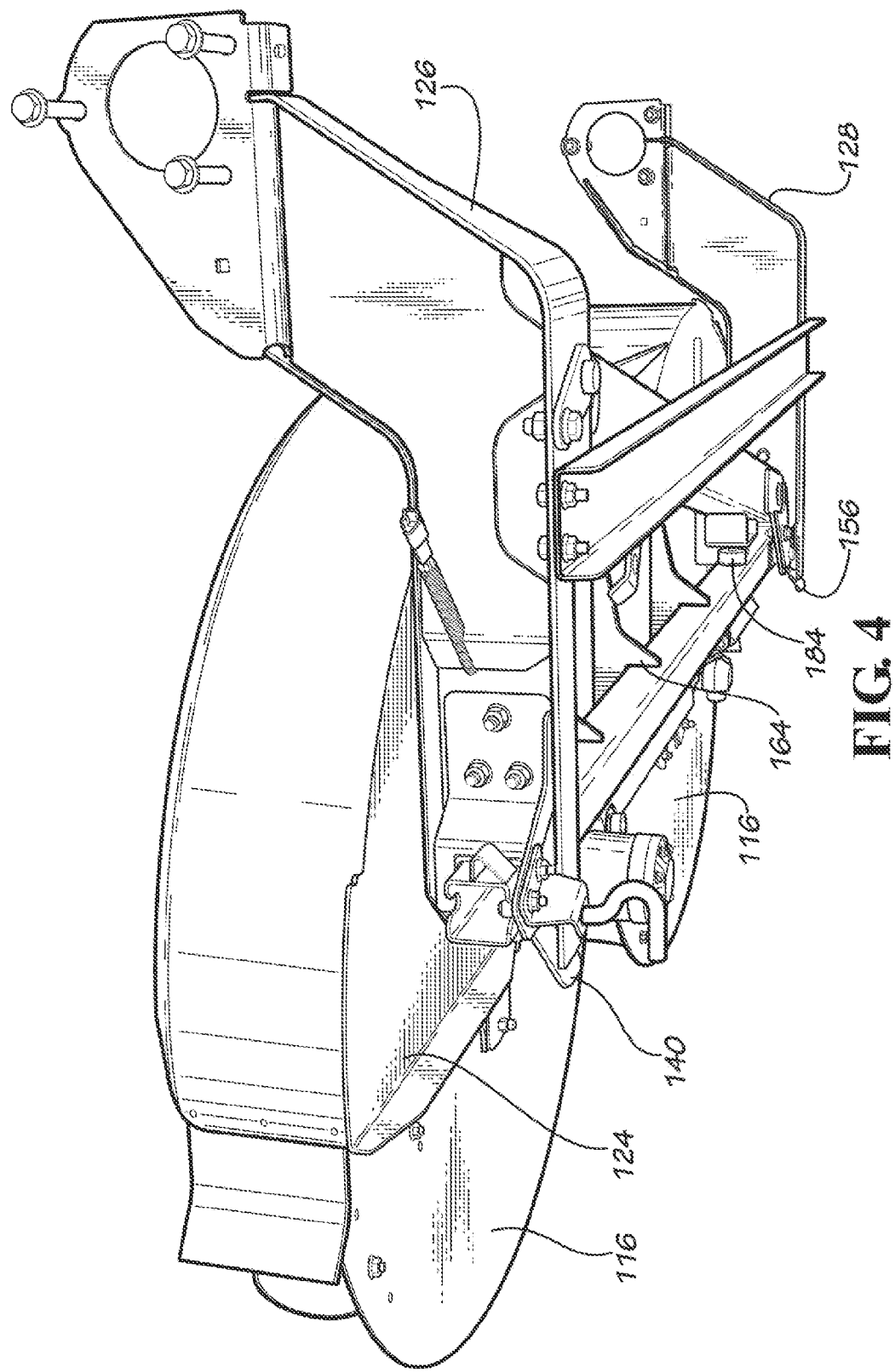
FIG. 4 is a perspective view of the agricultural support system of FIG. 3, with portions broken away.
Figure 5:
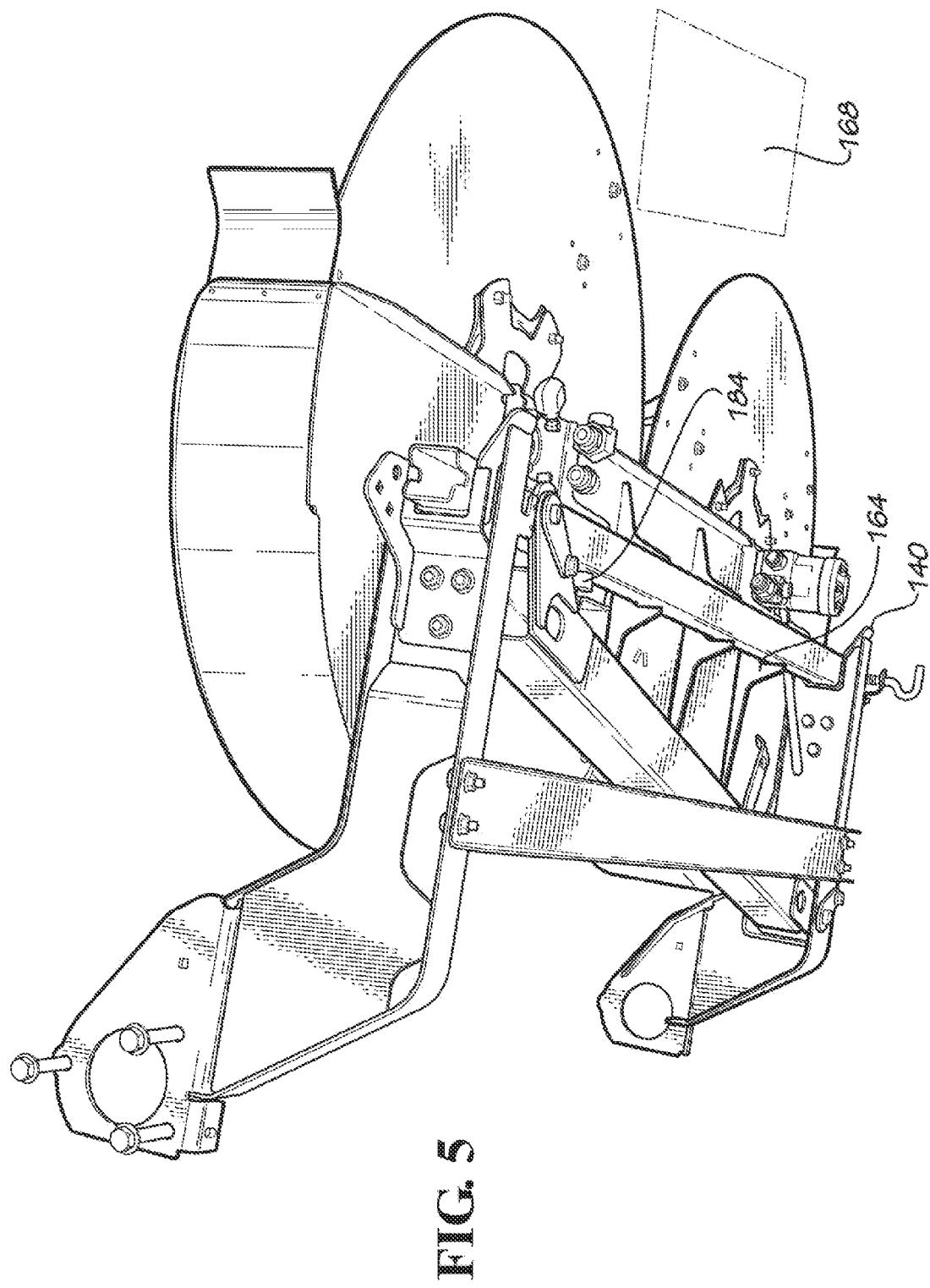
FIG. 5 is a perspective view of the agricultural support system of FIG. 3, with portions broken away.

According to an aspect of the present invention, and referring now to FIGS. 2-10, there is shown an agricultural machine 100 in the form of an agricultural harvester, which can be referred to as a combine, with portions broken away. While the drawings show agricultural harvester 100, it is understood that the present application can be applied to other forms of agricultural machines or equipment. Combine 100 includes a base member 102 (such as a chassis 102), wheels, and an agricultural support system 104 coupled with the base member 102. The agricultural support system 104 includes a residue assembly 106 and a support member assembly 108. Welded to the chassis 102 is a rear axle support to which the residue assembly is coupled, the rear axle support being considered as a part of chassis 102. Residue assembly 106 and support member assembly 108 are thus positioned on the rear of combine 100. Support member assembly 108 is pivotally coupled with base member 102 and is connected to residue assembly 106. Support member assembly 108 supports residue assembly 106 and is configured for moving residue assembly 106 relative to base member 102 between a residue assembly operating position 110 and a residue assembly service position 112 about a pivot axis 114 substantially without raising an elevation of residue assembly 106 when residue assembly 106 is in residue assembly service position 112. In this way, residue assembly 106 is not raised to an overhead position. FIG. 2 shows residue assembly 106 in a residue assembly operating position 112. FIG. 3 shows a more detailed view of the residue assembly 106, the residue assembly 106 being in a residue assembly operating position 110.

Residue assembly 106 can be a spreader assembly 106. As a spreader, spreader assembly 106 receives chaff from the cleaning system. Upon receiving this chaff, the spreader assembly 106 disburses the chaff away from the combine 100, casting the chaff onto the ground. Spreader assembly 106, in general, includes two rotating disks 116, a plurality of blades, bats, or paddles 118 attached to disks 116 (as used herein, the term "blades" with respect to spreader blades 118 is intended to encompass spreader blades, spreader bats, spreader paddles, or the like), and a plurality of cones 120 attached to disks 116. As the disks 116 rotate, blades 118 capture and cast the chaff away from combine 100. Arrow 122 shows the direction of rotation of one disk 116; the other disk 116 can rotate in an opposite direction. A single cone 120 is attached to each disk 116. Disks 116 are coupled with a support plate 124 (which can form at least part of a shroud around disks 116).

The agricultural support system 104 can further include a first bracket 126 and a second bracket 128 each of which are coupled with base member 102, and support member assembly includes a first elongate arm 146 and a second elongate arm 148. Each of brackets 126, 128 are attached to the chassis 102 by way of the rear axle support. FIG. 3 shows that first and second brackets 126, 128 each include mounting features 130 and bolts 132, the mounting features 130 and bolts 132 being used to mount first and second brackets 126, 128 to the rear axle support of chassis 102, a portion of the contour 134 of first and second brackets 126, 128 abutting and aligning with the rear axle support for support. Brackets 126, 128 can be made of steel (this being provided by way of example and not by way of limitation) and be formed as a weldment of a plurality of pieces. Further, the agricultural system can include two deflector assemblies 136 (which can be referred to herein simply as "deflectors")(deflectors 136 being shown in FIG. 3. Each deflector assembly 136 can include a plurality of pieces, including, but not limited to, a rubber curtain and a steel shield. Each deflector assembly 136 can be coupled with chassis 102 by way of a plurality of bolts and may or may not be connected with first and/or second brackets 126 (directly or indirectly), depending upon the design. Further, one or both deflector assemblies 136 can be coupled with the ramp (unlabeled) shown in FIG. 3 leading to spreader assembly 106 in the flow direction. Deflectors 136 help to direct chaff to disks 116.

Figure 9:
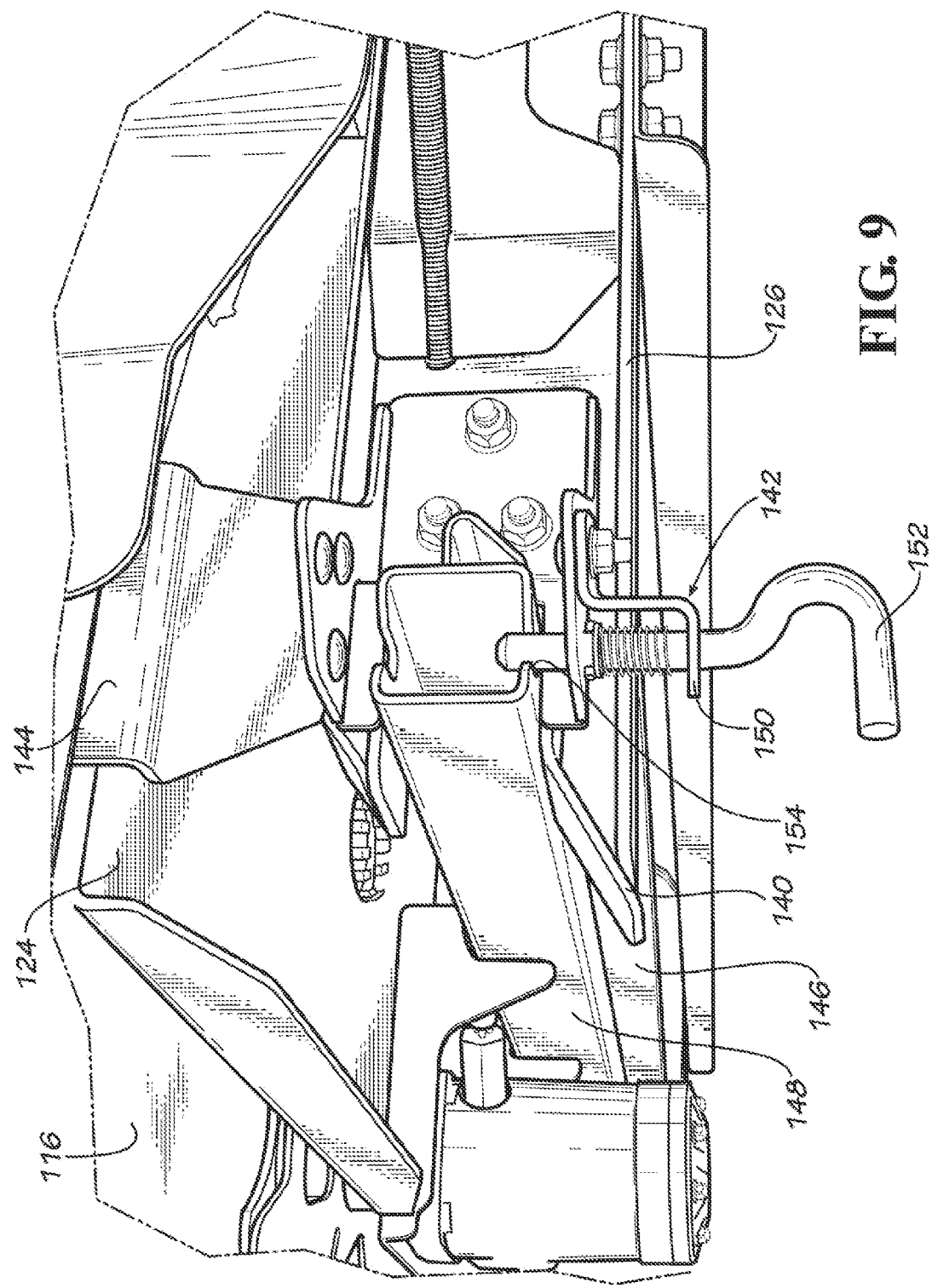
FIG. 9 is a perspective view of the agricultural support system of FIG. 3, with portions broken away.

First bracket 126 can include an L-shaped bracket 138. This L-shaped bracket 138 can be welded to one or more other portions of the first bracket 126 at the ends of the L. Further, first bracket 126 can have a first receiver weldment 140 (which can be referred to herein as a first receiver 140) which has a U-shaped opening directed rearwardly. First receiver 140 can receive a free end of second elongate arm 148 when residue assembly 106 is in the residue assembly operating position 110. First bracket 126 can also include a latching mechanism 142, which can be bolted and/or welded to other portions (which can include first receiver 140) of first bracket 126 and/or to an additional bracket 144 supporting the deflector 136. Latching mechanism 142 includes a base bracket 150, a pull-pin 152 with a handle, a spring, a washer, and a pin (the spring, washer, and pin are shown in FIG. 9 mounted to pull-pin 152). The pull-pin extends through two aligned holes in the base bracket 150, the spring, the washer, and the pin being positioned between walls of the base bracket 150. The spring biases the pull-pin 152 into an upward position. When in this upward position, the pull-pin 152 can engage a notch, slot, or hole 154 in the distal end of the second elongate arm 148 and thereby latch second elongate arm 148 in first receiver 140. Pull-pin 152 can be pulled downwardly to release pull-pin 152 from the notch/hole 154 in second elongate arm 148 and thereby release second arm 148 so that second arm 148 can be removed from first receiver 140. Thus, first bracket 126 includes a latching mechanism 142 configured for securing second elongate arm 142 in the residue assembly operating position 106.

Second bracket 128 can include a second receiver weldment 156 (which can be referred to herein as a second receiver 156) which has a U-shaped opening directly rearwardly. Second receiver 156 can receive an end (the end which pivotally connects with first elongate arm) of second elongate arm 148 when residue assembly 106 is in the residue assembly operating position 110. First and second receivers 140, 156 can each be referred to as a saddle or can collectively be referred to as a saddle. Depending upon the design choice, a bracket (similar to bracket 144) can be attached to an associated deflector assembly 136 and can be bolted to a bracket of second bracket 128.

Support member assembly 104 includes first elongate arm 146 and second elongate arm 148 which is pivotally connected to first elongate arm 146. First elongate arm 146 is pivotally connected to first bracket 126, and second elongate arm 148 is connected (for example, fixedly connected) to residue assembly 106. First and second elongate arms 146, 148 can be made of steel (this is provided by way of example and not by way of limitation) and can be tubular structures having a substantially square-shaped cross-section (this is provided by way of example and not by way of limitation). First and second arms 146, 148 thus provide moving linkages between first bracket 126 and spreader assembly 106.

Figure 7:
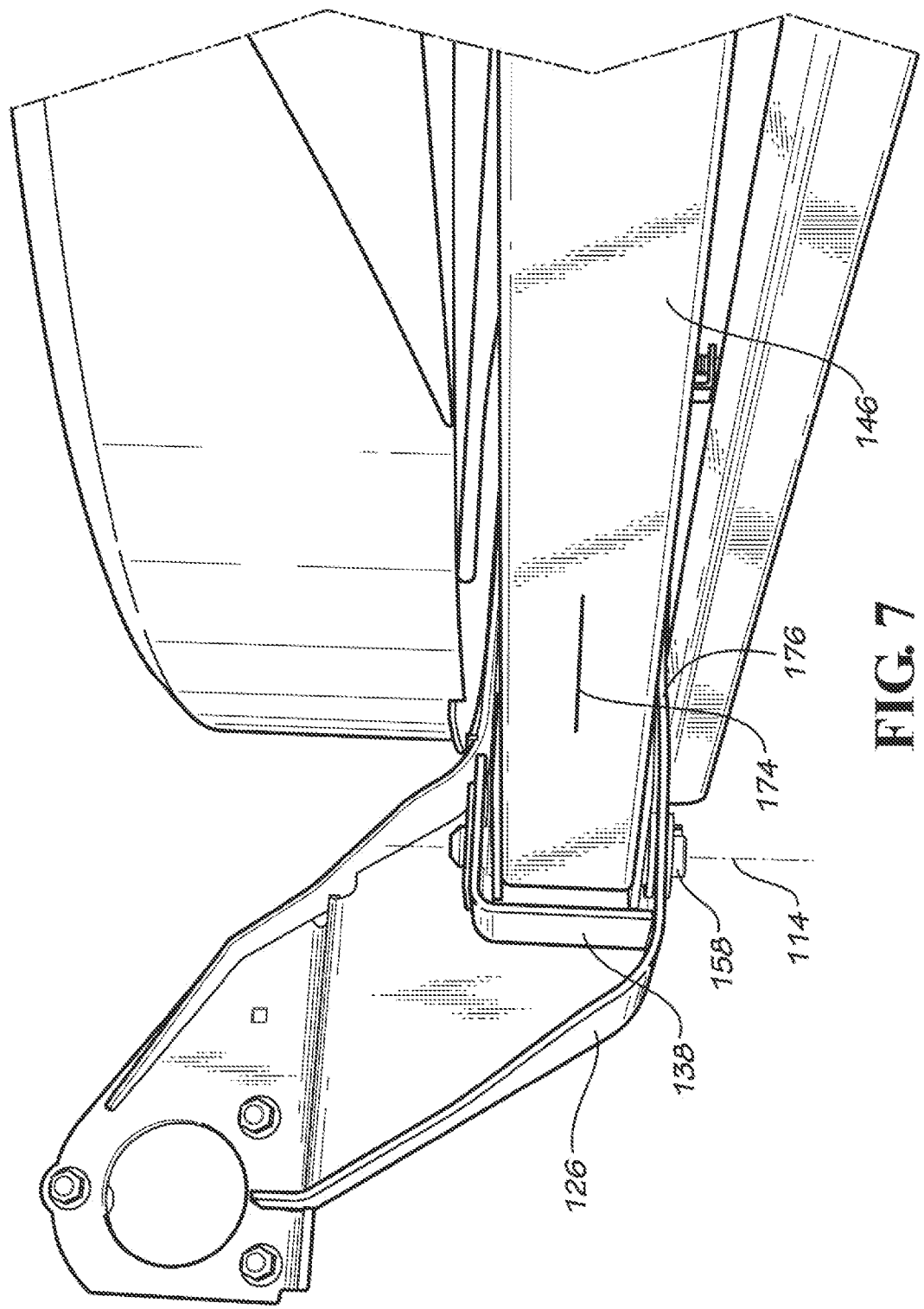
FIG. 7 is a perspective view of the agricultural support system of FIG. 3, with portions broken away.

First arm 146 is connected to first bracket 126 by way of a pivotal connection, as shown in FIG. 7. L-shaped bracket 138 is used to form the pivotal connection with the first elongate arm 146. More specifically, one longitudinal end of first arm 146 can be positioned within the open portion of the L of the L-shaped bracket 138, and a pivot pin 158 can extend through aligned holes of one leg of the bracket 138, through first arm 146, and through an additional portion of first bracket 126. First arm 146 can have additional mounting plates welded thereto to help form the pivot connection. Additional washers and/or other structural pieces can be used to fill the spaces between first arm 146, bracket 138, and bracket 126. Further, first arm 146 can be coupled with second arm 148 by way of a pivot connection. Parallel mounting plates 160 welded to the sides of one end of first arm 146 can be positioned about an end of second arm 148, and a pivot pin 162 can extend through these mounting plates 160 and also through second arm 148, additional washers and/or other structural pieces being used to stabilize the pivot connection.

Second arm 148 can be fixedly secured to spreader assembly 106. More specifically, second arm 148 is fixedly secured to mounting plate 124 of spreader assembly 106. Mounting plate 124 includes a plurality of U-shaped brackets 164 depending from the bottom of mounting plate. Second arm 148 is positioned within these U-shaped brackets 164 and can be welded thereto to form a secure connection. In this way, spreader assembly 106 moves with second arm 148.

Figure 6:
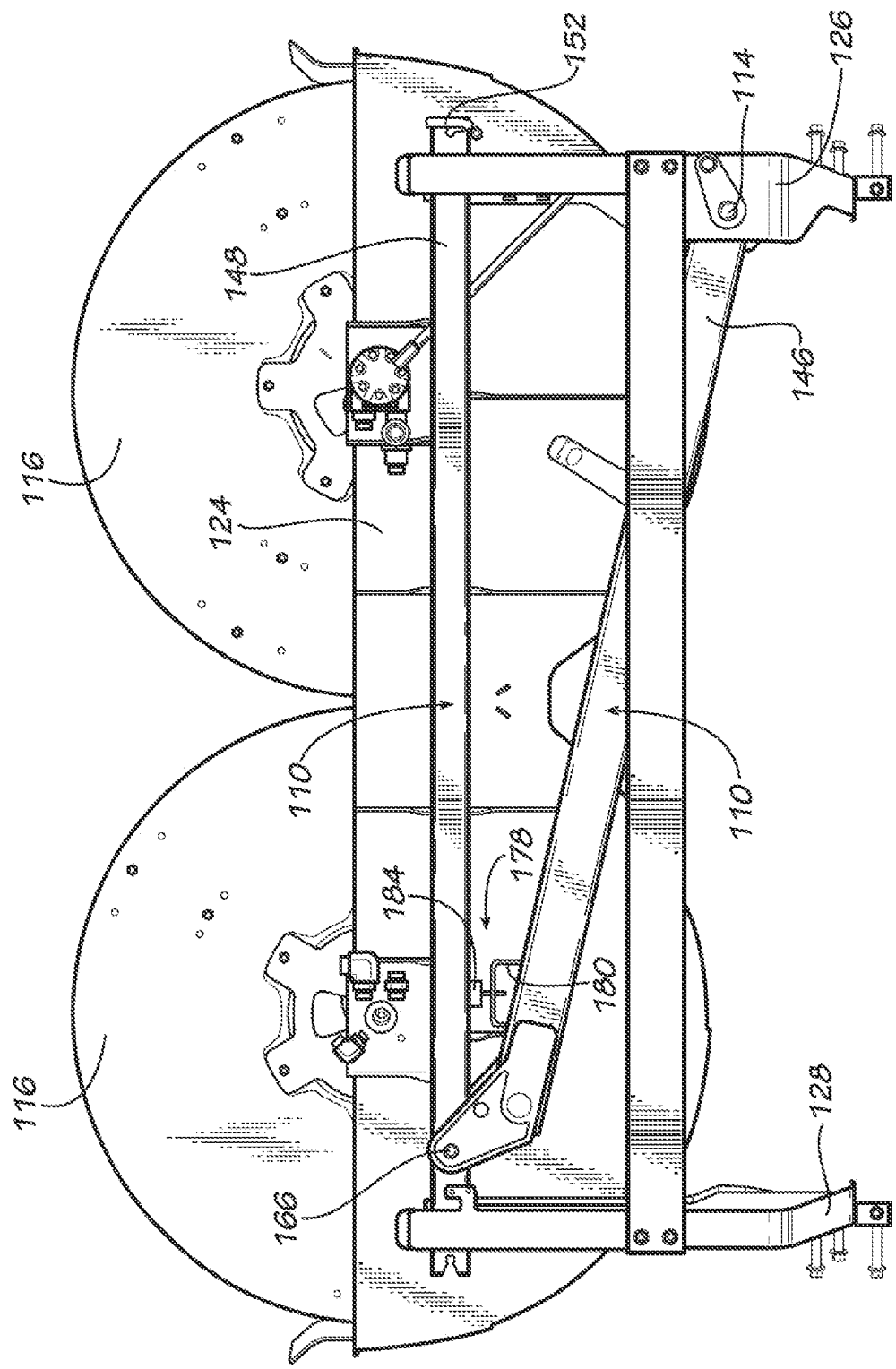
FIG. 6 is a bottom view of the agricultural support system of FIG. 3, with portions broken away.
Figure 8:
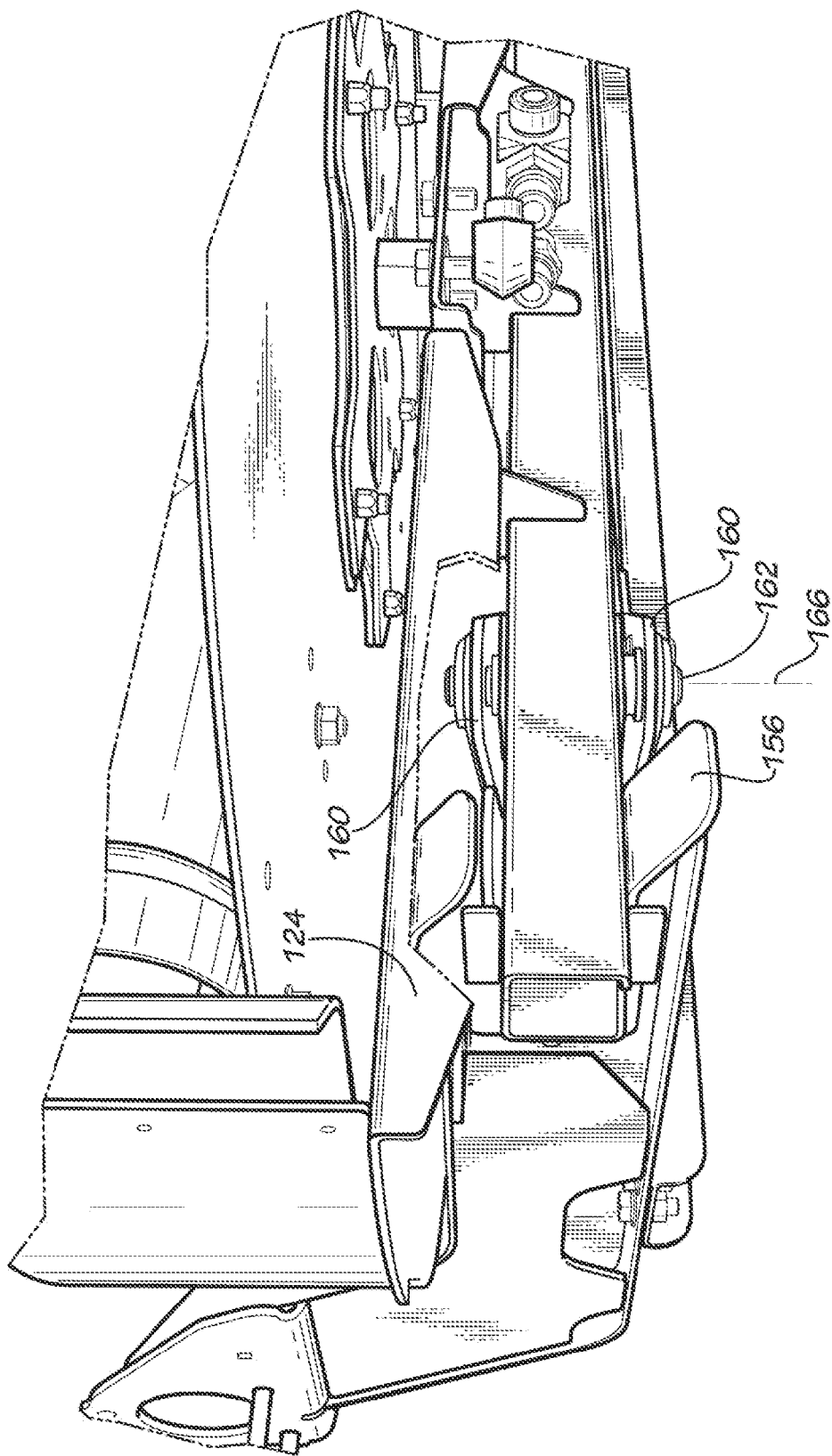
FIG. 8 is a perspective view of the agricultural support system of FIG. 3, with portions broken away.

FIGS. 3-9 (as well as FIGS. 11-12) show residue assembly 106 in the residue assembly operating position 110. When in the residue assembly operating position 110, residue assembly 106 is in position and is thus ready to receive chaff and spread the chaff on the ground. By contrast, when residue assembly 106 is in the residue assembly service position 112, residue assembly 106 is not in position to receive chaff to be spread on the ground; rather, when residue assembly 106 is in the residue assembly service position 112, residue assembly 106 is essentially out-of-the way so that an operator can work on and thereby service portions of the combine 100. As shown in FIGS. 4-6 and 9, first elongate arm 146 and second elongate arm 148 are folded relative to one another when residue assembly 106 is in residue assembly operating position 110. As shown in FIG. 2, first elongate arm 146 and second elongate arm 148 are unfolded relative to one another when residue assembly 106 is in residue assembly service position 112. Support member assembly 108 is connected to each of first bracket 126 and second bracket 128 when residue assembly 106 is in residue assembly operating position 110 and is connected to first bracket 126 but not second bracket 128 when residue assembly is in residue assembly service position 112. More specifically, when residue assembly 106 is in residue assembly operating position 110, first arm 146 is attached to first bracket 126 by way of the pivot connection (using L-shaped bracket 138). Further, when residue assembly 106 is in residue assembly operating position 110, second arm 148 is attached to second bracket 128 by way of second receiver 140 and is also attached to first bracket 126 by way of first receiver 140 and latching mechanism 142. After pulling pull-pin 152 and thereby unlatching second arm 148 from first bracket 126, second arm 128 can be removed from both first receiver 140 and second receiver 156, thereby detaching second arm 148 from both first and second brackets 126, 128, while first arm 146 remains pivotally connected to first bracket 126. Second arm 148 can be moved further way from first and second brackets 126, 128 by pivoting spreader assembly 106 about pivot axis 114. Second arm 148 can be further extended from first and second brackets 126, 128 by pivoting second arm 148 relative to first arm 146 by way of a second pivot axis 166. When pivoting first arm 146, first arm 146 can pivot all the way so that first arm 146 is substantially parallel to first bracket 126, first arm 146 then extending straight rearwardly of chassis 102; alternatively, first arm 146 can be pivoted to an intermediate position which is not as far as being pivoted straight rearwardly. Similarly, second arm 148 can be pivoted about second axis 166 to various predetermined or non-predetermined positions relative to first arm 146. As indicated in FIGS. 6-8, first pivot axis 114 and second pivot axis 166 are substantially vertical, in particular with reference to base member 102. In this way, first and second arms 146, 148 pivot on a horizontal plane 168 relative to the base member 102 (and, assuming combine 100 is positioned on level ground, relative to the ground as well). The horizontal plane, as shown by a reference line 174 in FIG. 7, can be substantially parallel to the base 176 of bracket 126. In this way, support member assembly 108 is configured for moving residue assembly 106 relative to base member 102 between residue assembly operating position 110 and residue assembly service position 112 about pivot axis 114 substantially without raising an elevation of residue assembly 106 when residue assembly 106 is in residue assembly service position 112. Thus, support member assembly 108 is configured for moving residue assembly 106 relative to base member 102 substantially on horizontal plane 168 relative to base member 102 between residue assembly operating position 110 and residue assembly service position 112 when residue assembly 106 pivots about pivot axis 114.

Figure 10:
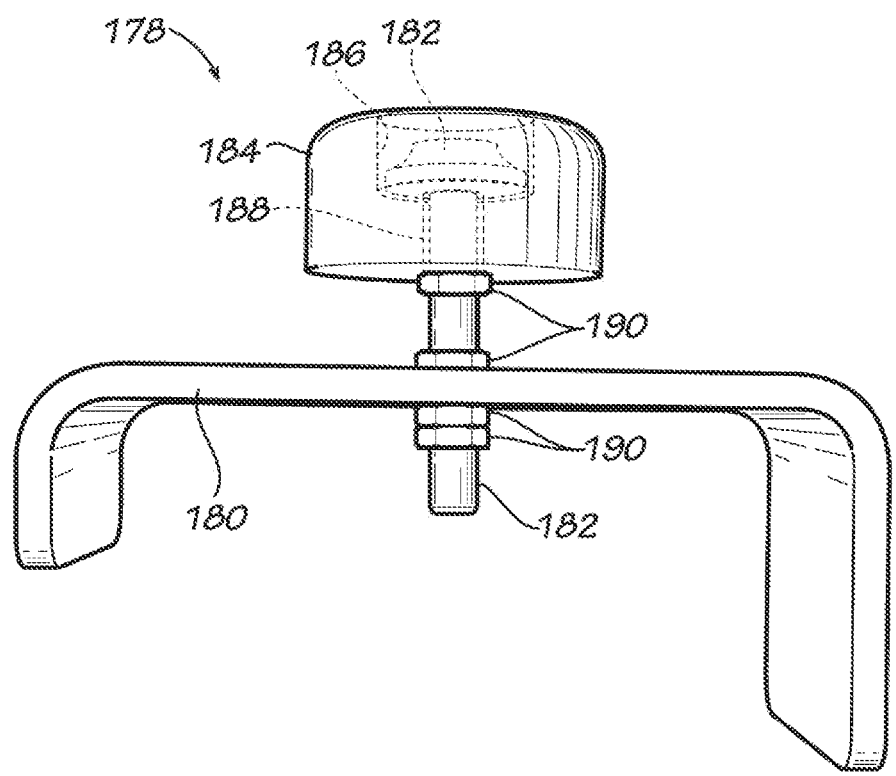
FIG. 10 is a perspective view of a stopper assembly of the agricultural support system of FIG. 3.

FIGS. 4-6 and 10 show that first elongate arm 146 can include a stopper assembly 178. Stated another way, first elongate arm 146 includes a stopper 178 which abuts second elongate arm 148 when residue assembly 106 is in residue assembly operating position 112. Stopper assembly 178 includes a bracket 180 welded to one side of first arm 146. Attached to bracket 180 is a threaded bolt 182, although bolt 182 is not necessarily threaded to bracket 180. Bolt 182 is attached to a rubber pad 184 which serves as a bumper. Pad includes a first channel 186 and a second channel 188; channels 186 and 188 can each have a circular cross-section transverse to the longitudinal axis of bolt 182. Seated within first channel 186 is the head (such as a hexagonal head) of bolt 182, as well as a washer positioned between the head of bolt 182 and rubber pad 184, as shown in FIG. 10. The shaft of bolt 182 extends through second channel 188. Further, four nuts 190 (more or less can be used) are threaded onto bolt 182 and are used to secure rubber pad 184 in position on bolt 182. As shown in FIG. 10, the top nut 190 secures rubber pad 184 between the washer and the head of bolt 182. The bottom three nuts 190 are used to secure the shaft of bolt 182 to bracket 180. When second arm 148 is folded relative to first arm 146, rubber pad 184 presses on second arm 148 (for example, when the residue assembly 106 is in the residue assembly operating position 110 or even when first arm 146 is extended outwardly away from residue assembly operating position 110 but second arm 148 has not yet been rotated away from first arm 146). In the operating position 110, second arm 148 rests on supports (receivers 142 and 156 respectively of first bracket 126 and second bracket 128) and is pinned on only one side (using latching mechanism 142). Using stopper assembly 178 provides that only one latch is required in residue assembly operating position 110 (in other words, a latching mechanism is not required to further secure the end of second arm 148 in association with being received by receiver 156). As spreader assembly 106 is moved from service position 112 to operating position 110, rubber pad 184 contacts second arm 148, thereby stopping further rotation of that joint (associated with pivot axis 166) and allowing rotation of only the forward pivot (associated with pivot axis 114). The combination of stopper assembly 178 and the saddle plated for second arm 148 (the saddle collectively including receivers 140 and 156 and supporting second arm 148 when second arm is closed) allows the part (second elongate arm 148) to be restrained with only one pin/latch (that being latching mechanism 142). Stated another way, rubber pad 184 keeps second arm 148 and first arm 146 from further pivoting motion toward one another and thereby forces the tubes 146, 148 to move together. As necessary (for example, to obtain the proper spacing between first and second arms 146, 148 for seating second arm in receivers 140 and 156), the spacing of nuts 190 on bolt 182 can be adjusted on bolt 190 to move rubber pad 184 further towards or further away from first arm 146.

In assembly, first and second brackets 126, 128 can be attached to the chassis 102 by way of the rear axle support. First arm 146 can be pivotally secured to first bracket 126 by way of L-shaped bracket 138. Second arm 148 (either prior to or after securing first arm 146 to first bracket 126) can be pivotally attached to second arm 148 by way of a pivot joint (forming pivot axis 166). Prior to attaching second arm 148 to first arm 146, at least prior to installing second arm 148 on first bracket 126 by way of first arm 146, mounting plate 124 of spreader assembly 106 can be secured to second arm 148, for instance, by welding. First and second receivers 140, 156 being welded as part of their respective first and second brackets 126, 128, and latching mechanism 142 being welded and/or bolted to one or more portions of first bracket 126 and, optionally, to a bracket 144 supporting deflector 136, second arm 148 can be seated in first and second receivers 140, 156 and latched by way of latching mechanism 142. This places residue assembly 106 in the residue assembly operating position 110. Bracket 180 of stopper assembly 178 can be welded to first arm 146, and bolt 182 can be secured to bracket 180, pad 184 being secured to bolt 182. The major components of the present invention can be made of steel and can be formed in any number of ways, including, but not limited to, forming, pressing, bending, punching, piercing, machining, casting, molding, stamping, folding, welding, and/or cutting.

In use, when residue assembly 106 is in residue assembly operating position 110, residue assembly 106 can be operated as a spreader of, for instance, chaff. To move spreader assembly 106 to residue assembly service position 112, pull-pin 152 of latch assembly 142 is pulled downwardly to release pull-pin 152 from hole/slot 154, and second arm 148 is removed (for example, manually by an operator) from first and second receivers 140, 156. The operator can then grasp spreader assembly 106 in a secure location on spreader assembly 106 (such as on mounting plate 124) or can grasp either or both of first and second arms 146, 148 and then move spreader assembly 106 from residue assembly operating position 110 to residue assembly service position 112 about first axis 114. This movement of first arm 146 between residue assembly operating position 110 and residue assembly service position 112 is shown by double-arrows 170 and 172. Residue assembly service position 112 is shown in FIG. 2 such that first arm 146 is directly rearward of chassis 102. However, it is understood that first arm 146 can be in the residue assembly service position 112 and can thereby occupy any number of intermediate positions out of residue assembly operating position 110 to this directly rearward position. Further, second arm 148 can be pivoted in various positions about second axis 166 such that spreader assembly 106 is in the residue assembly service position 112, depending upon the needs of an operator who is servicing the combine 100. FIG. 2 shows second arm 148 in one such position, that being such that second arm 148 is extended outwardly in the vicinity of, but clear of, one of the wheels 14. This movement of second arm 148 between residue assembly operating position 110 and residue assembly service position 112 is shown by double-arrow 172. When so desired, first and second arms 146, 148 can returned to a folded position relative to one another by moving first and second arms 146, 148 in a reverse direction in a similar manner as described when moving spreader assembly 106 to the residue assembly service position 112. Second arm 148 can be re-seated in first and second receivers 140, 156, after pulling pull-pin 152 to provide clearance. After so re-seating second arm 148, pull-pin 152 can be released so that it extends upwardly into hole/slot 154 and thereby re-latches second arm 148 so that spreader assembly 148 is again in residue assembly operating position. When rotating first and second arms 146, 148 relative to one another, rubber pad 184 can contact second arm 148 to ensure proper spacing between arms 146, 148, to facilitate movement of arms 146, 148 so that they move together as a unit, and to provide that only one latching mechanism is needed to secure second arm 148 in receivers 140 and 156.

In summary, the spreader 106 (specifically, disks 116) as shown in the figures can be driven from below. However, it is possible to use a similar system driven from above. Also, the embodiment of the present invention discussed herein uses hydraulically driven spreaders (for example, the spreaders can be hydraulic spreaders). However, it is possible to use a mechanically driven version. Further, the current spreader gearboxes, pulleys, and belts are to be removed. Starting with the spreaders themselves, the spreader disks 116 can be hydraulically driven with the motors mounting below the respective disk. There can be a shroud (including support/mounting plate 124) constructed around the disk 116, and this is where the motors can mount. This shroud can have a pivot joint biased to one side of the structure, and connected to this pivot can be another link that attaches to the chassis by a second pivot joint. This double pivot allows the spreader structure to move almost straight rearward for a short time to clear any shielding on the combine along with the tires. After the structure is beyond the tires, the structure can be swung to the side of the machine to hang beside one of the tires. Bolted to the chassis 102 are two supporting brackets 126, 128. These brackets 126, 128 can have geometry that will catch the shroud structure and support it during normal operation. The pivot points are then only for use during service on the machine. During normal operation, the spreader assembly (spreader disks, motors, and shroud mentioned above) is supported by brackets 126, 128 mounted to the chassis 102 of the machine. When it is desired to access the chopper or separator via the rear hood of the machine, the spreaders can be unlatched and swung from the operational position 110 to the service position 112, which is to the right rear corner of the machine. This allows for very open access to the chopper and separator. The spreader assembly 106 is connected to the chassis by a link (generally, links 146 and 148) that is also allowed to pivot. This allows the spreader assembly 106 to move almost straight rearward to avoid collision with shielding present on the rear of the machine and also to avoid the tires. This also allows the spreader to be swung into a number of positions that may be desirable for different service positions. For example, the spreader 106 could be swung out and positioned straight rearward along the centerline of the machine 100. This may be a desirable position when changing the sieves that are in the machine. This allows two technicians (one on each side of the spreader) to carry the sieves into or out of the machine 100.

Figure 11:
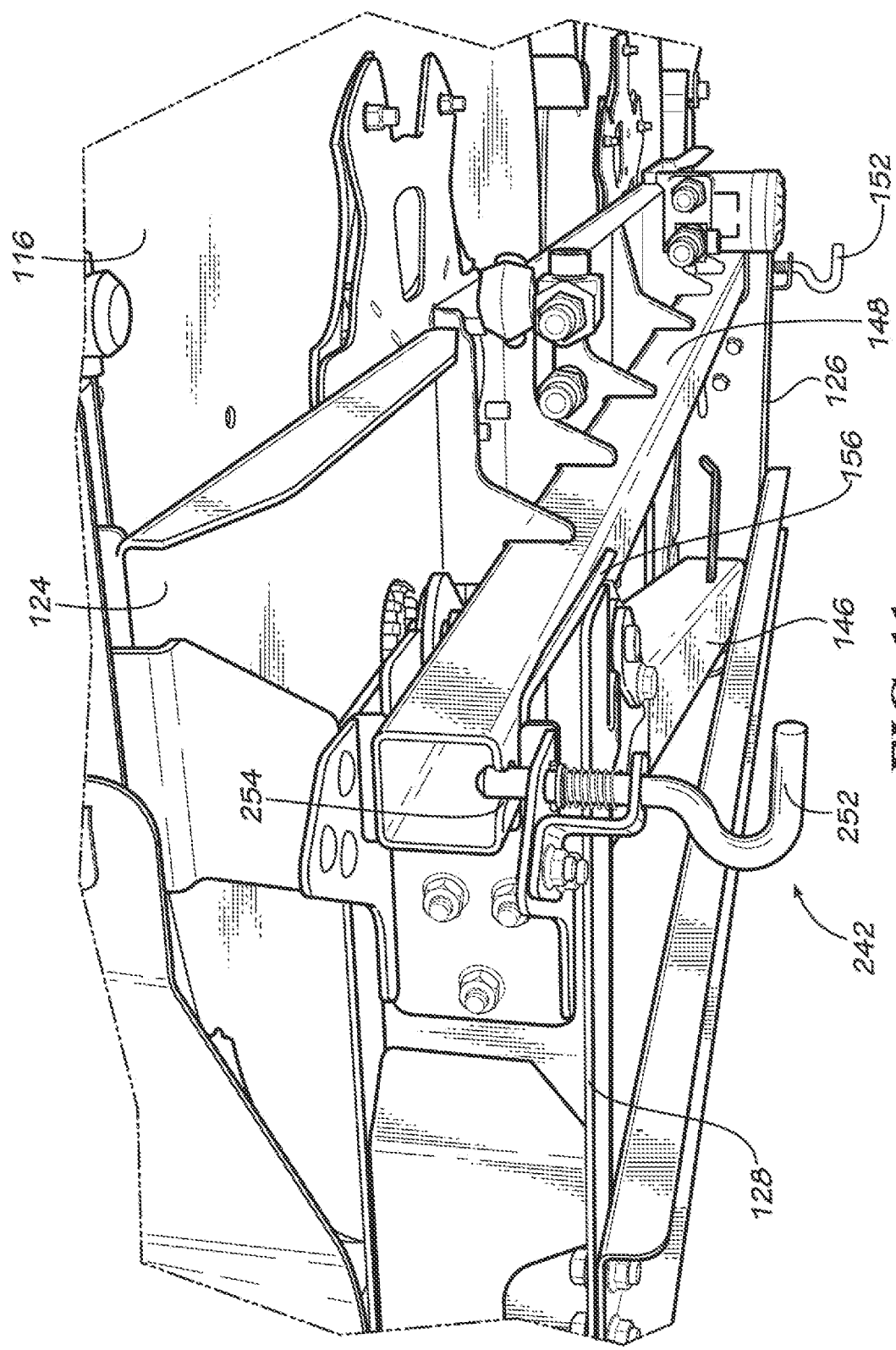
FIG. 11 is a perspective view of another embodiment of the agricultural system according to the present invention.

FIG. 11 shows another embodiment of the present invention. In this embodiment, the present invention is substantially similar to the embodiment described relative to FIGS. 1-10, except that stopper assembly 178 is not necessarily used and an additional latching mechanism is used. More specifically, second elongate arm 148 seats within second receiver 156 (as above) but is also latched with a latching mechanism 242 that is similar to latching mechanism 142. Latching mechanism 242 also includes a spring-loaded pull-pin 252 that can seat within or removed from a slot or hole 254 in one end of second arm 148. The brackets supporting and/or associated with pull-pin 252 can be attached to other portions of second bracket 128 and also to a deflector assembly 136, latching mechanism 242 being considered as forming a part of second bracket 128. In this way, second bracket 128 includes latching mechanism 242 configured for securing second elongate arm 148 in residue assembly operating position 110. The operation of this latching mechanism 242 is otherwise similar to that of latching mechanism 142. To move residue assembly from residue assembly operating position 110 to residue assembly service position 112, latching mechanism 142 can be released first, and the free end of second arm 148 can be removed from receiver 140. Then, latching mechanism 242 can be released, and the pivot end of second arm 148 can be removed from receiver 156. Residue assembly 106 can be returned to the residue assembly operating position 110 by reversing these steps, although it is possible to re-latch latching mechanism 142 before re-latching latching mechanism 242.

Figure 12:
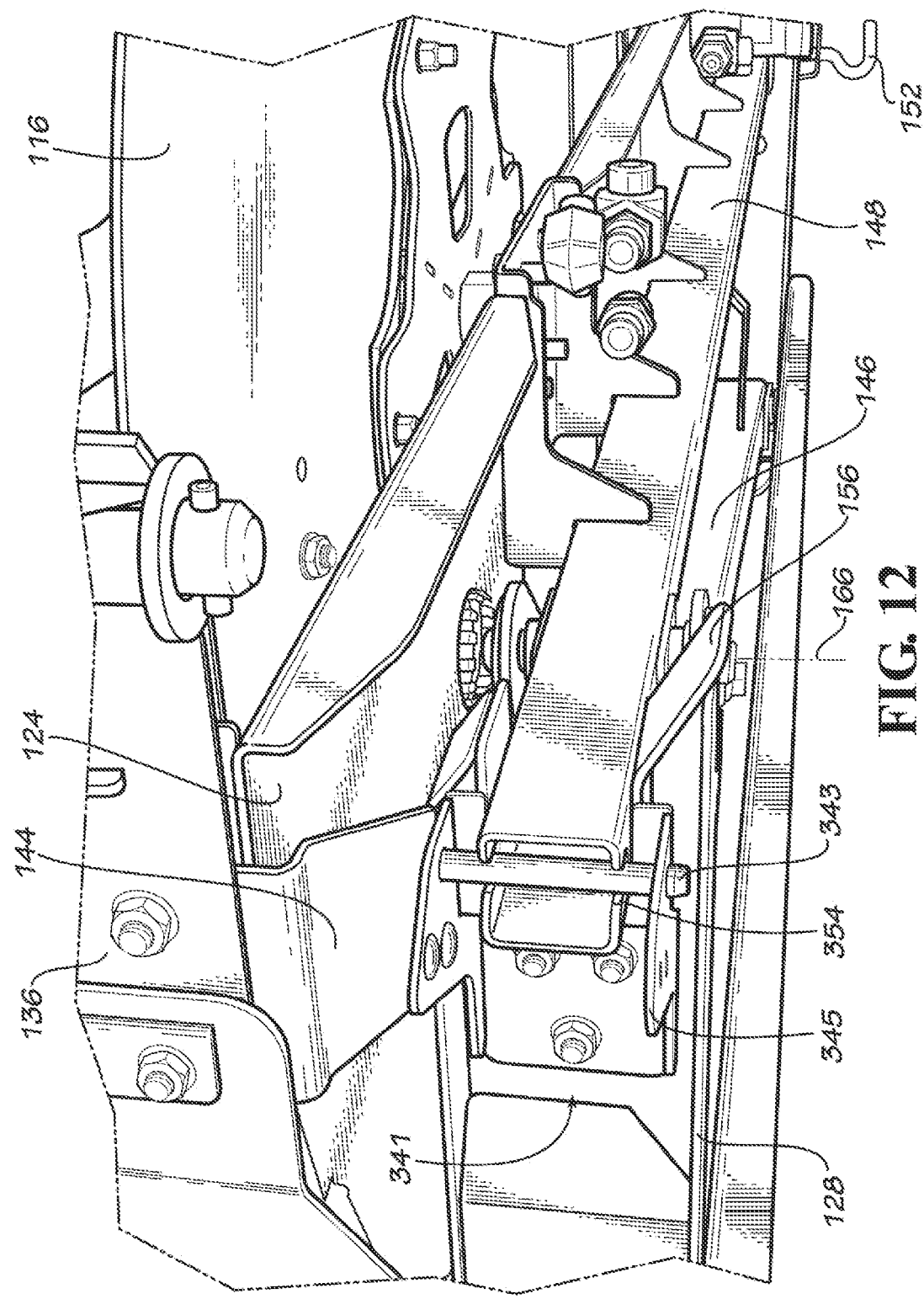
FIG. 12 is a perspective view of yet another embodiment of the agricultural system according to the present invention.

FIG. 12 shows yet another embodiment of the present invention. In this invention, the present invention is substantially similar to the embodiment described relative to FIGS. 1-10, except that stopper assembly 178 is not necessarily used and an additional holding mechanism is used. More specifically, second elongate arm 148 seats within second receiver 156 (as above) but is also held with a holding mechanism 341. Holding mechanism 341 does not include a pull-pin arrangement but instead uses a fixed pin 343. Holding mechanism 341 further includes a bracket 345 similar to what is shown in FIG. 9, bracket 345 being attached to one or more other portions of second bracket 128. Holding mechanism 341 can be considered as being a part of second bracket 128; in this way, second bracket 128 includes fixed pin 343. Bracket 345 includes parallel plates each with corresponding holes, fixed pin 343 being vertically positioned within aligned ones of such holes. A bracket 144 can be used to attach bracket 345 with a deflector 136. Pin 343 can extend through both parallel plates of bracket 345 and also through bracket 144 and can be secured to the corresponding brackets using a threaded connection (that is, the ends of pin 343 can be threaded and nuts can be secured to these ends), a welded connection, or any other suitable connection. Second elongate arm includes a slot 354. Pin 343 seats within slot 354 in the end of second arm 148. Stated another way, fixed pin 343 seats within slot 354 when residue assembly 106 is in residue assembly operating position 110. In use, to move residue assembly 106 out of residue assembly operating position 110 and to residue assembly service position 112, pull-pin 152 of latching mechanism 142 is pulled and the free end of second arm 148 is pulled out of receiver 140. Second arm 148 can be pivoted about pivot axis 166, and then first arm 146 can be pivoted about pivot axis 114 so that second arm 148 can be unseated from pin 343 and second arm 148 can be removed from receiver 156. That is, the rotation of first arm 146 about pivot axis 114 from operating position 110 pushes second arm 148 from pin 343 (otherwise considered, this rotation of first arm 146 can be said to pull pin 343 out of slot 354). To return residue assembly 106 to residue assembly operating position 110, first arm 146 is pivoted about pivot axis 114, and second arm 148 is angled relative to pin 343, so that slot 354 can be pushed onto pin 343. After so doing, second arm 148 is pivoted about pivot axis 166 (and slot 354 is pivoted about pin 343) until second arm 148 reseats within receivers 140, 156 (pull-pin 152 having been pulled and then released to re-latch the free end of second arm 148). This arrangement advantageously provides that, using the correct procedure to open and close the framework (spreader assembly 106), only one latching mechanism (that is, latching mechanism 142) is required for the operator to release second arm 148.

Further, the present invention can be provided in additional alternative embodiments. For example, the system of the present invention can have one pivot point, instead of two pivot points as disclosed above. Further, the spreaders (the disks 116 and associated structure) can be provided so as to be driven from above. Further, the spreaders can be constructed without a shroud (including, but not necessarily limited to, mounting plate 124 and/or the upstanding walls around disks 116). Further, the system (that is, disks 116) can be provided so as to be mechanically driven. Further, instead of pivoting together, the two spreader disks 116 can be provided so as to pivot separately into service positions.

The present invention further provides a method for a method of using an agricultural machine, the method including the steps of: providing base member 102, residue assembly 106, and support member assembly 108, support member assembly 108 being pivotally coupled with base member 102 and being connected to residue assembly 106, support member assembly 108 supporting residue assembly 106; and moving, using support member assembly 108, residue assembly 106 relative to base member 102 between residue assembly operating position 110 and residue assembly service position 112 about pivot axis 114 substantially without raising an elevation of residue assembly 106 when residue assembly 106 is in residue assembly service position 112. Agricultural machine 100 is an agricultural harvester 100, residue assembly 106 being a spreader assembly 106. The method can further include providing first bracket 126 and second bracket 128, first bracket 126 and second bracket 128 being coupled with base member 102, support member assembly 108 being connected to each of first bracket 126 and second bracket 128 when residue assembly 106 is in residue assembly operating position 110 and being connected to first bracket 126 but not second bracket 128 when residue assembly 106 is in residue assembly service position 112. Support member assembly 108 includes first elongate arm 146 and second elongate arm 148 pivotally connected to first elongate arm 146, first elongate arm 146 being pivotally connected to first bracket 126, second elongate arm 148 being connected to residue assembly 106. Support member assembly 108 moves residue assembly 106 relative to base member 102 substantially on a horizontal plane 168 relative to base member 102 between residue assembly operating position 110 and residue assembly service position 112 when residue assembly 106 pivots about pivot axis 114. First elongate arm 146 and second elongate arm 148 are folded relative to one another when residue assembly 106 is in residue assembly operating position 110 and are unfolded relative to one another when residue assembly 106 is in residue assembly service position 112. First elongate arm 146 can include a stopper 178 which abuts second elongate arm 148 when residue assembly 106 is in residue assembly operating position 110, first bracket 126 including a first latching mechanism 142 configured for securing second elongate arm 148 in residue assembly operating position 112. First bracket 126 includes first latching mechanism 142 configured for securing second elongate arm 148 in residue assembly operating position 110, (a) second bracket 128 including a second latching mechanism 242 configured for securing second elongate arm 148 in residue assembly operating position 110; or (b) second elongate arm 148 including slot 354, second bracket 128 including fixed pin 343 which seats within slot 354 when residue assembly 106 is in residue assembly operating position 110.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural machine, comprising:
a base member;
a residue assembly;
a support member assembly being pivotally coupled with said base member and being connected to said residue assembly, said support member assembly supporting said residue assembly and being configured for moving said residue assembly relative to said base member between a residue assembly operating position and a residue assembly service position about a pivot axis substantially without raising an elevation of said residue assembly when said residue assembly is in said residue assembly service position, said support member assembly including a first bracket and a second bracket, said first bracket and said second bracket being coupled with said base member, said support member assembly being connected to each of said first bracket and said second bracket when said residue assembly is in said residue assembly operating position and being connected to said first bracket but not said second bracket when said residue assembly is in said residue assembly service position, and a first elongate arm and a second elongate arm pivotally connected to said first elongate arm, said first elongate arm being pivotally connected to said first bracket, said second elongate arm being connected to said residue assembly.

2. The agricultural machine of claim 1, wherein the agricultural machine is an agricultural harvester, said residue assembly being a spreader assembly.

3. The agricultural machine of claim 1, wherein said support member assembly is configured for moving said residue assembly relative to said base member substantially on a horizontal plane relative to said base member between said residue assembly operating position and said residue assembly service position when said residue assembly pivots about said pivot axis.

4. The agricultural machine of claim 3, wherein said first elongate arm and said second elongate arm are folded relative to one another when said residue assembly is in said residue assembly operating position and are unfolded relative to one another when said residue assembly is in said residue assembly service position.

5. The agricultural machine of claim 4, wherein said first elongate arm includes a stopper which abuts said second elongate arm when said residue assembly is in said residue assembly operating position, said first bracket including a first latching mechanism configured for securing said second elongate arm in said residue assembly operating position.

6. The agricultural machine of claim 4, said first bracket includes a first latching mechanism configured for securing said second elongate arm in said residue assembly operating position, one of: (a) said second bracket including a second latching mechanism configured for securing said second elongate arm in said residue assembly operating position; and (b) said second elongate arm including a slot, said second bracket including a fixed pin which seats within said slot when said residue assembly is in said residue assembly operating position.

7. An agricultural support system for being coupled with a base member of an agricultural machine, said agricultural support system comprising:

a residue assembly;

a support member assembly configured for being pivotally coupled with the base member, said support member assembly being connected to and supporting said residue assembly and being configured for moving said residue assembly relative to said base member between a residue assembly operating position and a residue assembly service position about a pivot axis substantially without raising an elevation of said residue assembly when said residue assembly is in said residue assembly service position, said support member assembly including a first elongate arm pivotally connected to the base member and a second elongate arm pivotally connected to said first elongate arm, said second elongate arm being connected to said residue assembly, said support member assembly being configured for moving said residue assembly relative to said base member substantially on a horizontal plane relative to said base member between said residue assembly operating position and said residue assembly service position when said residue assembly pivots about said pivot axis.

8. The agricultural support system of claim 7, wherein said residue assembly is a spreader assembly.

9. The agricultural support system of claim 7, wherein said first elongate arm and said second elongate arm are folded relative to one another when said residue assembly is in said residue assembly operating position and are unfolded relative to one another when said residue assembly is in said residue assembly service position.

\* \* \* \* \*